(12) United States Patent
Hayashi

(10) Patent No.: US 8,359,539 B2
(45) Date of Patent: Jan. 22, 2013

(54) IMAGE PROCESSING APPARATUS, INFORMATION PROCESSING METHOD, AND COMPUTER-READABLE MEMORY MEDIUM STORING PROGRAM THEREIN

(75) Inventor: Eiji Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 10/988,772

(22) Filed: Nov. 16, 2004

(65) Prior Publication Data

US 2005/0088677 A1   Apr. 28, 2005

Related U.S. Application Data

(63) Continuation of application No. 09/491,865, filed on Jan. 27, 2000, now abandoned.

(30) Foreign Application Priority Data

Jan. 29, 1999   (JP) .................................... 11-021683

(51) Int. Cl.
G06F 3/048 (2006.01)
G06F 3/12 (2006.01)

(52) U.S. Cl. ......... 715/738; 715/273; 715/274; 715/750

(58) Field of Classification Search ................ 358/3.23, 358/1.16, 1.15; 355/112; 345/339; 715/839, 715/273, 274, 750; 707/102
See application file for complete search history.

(56) References Cited

U.S. PATENT DOCUMENTS

| | | | | |
|---|---|---|---|---|
| 5,547,178 A * | 8/1996 | Costello | ...... | 270/52.02 |
| 5,592,881 A * | 1/1997 | Rabjohns | ...... | 101/483 |
| 5,625,757 A * | 4/1997 | Kageyama et al. | ...... | 358/1.14 |
| 5,777,882 A * | 7/1998 | Salgado | ...... | 700/214 |
| 5,832,298 A * | 11/1998 | Sanchez et al. | ...... | 710/8 |
| 5,859,623 A | 1/1999 | Meyn et al. | ...... | 345/730 |
| 5,953,007 A * | 9/1999 | Center et al. | ...... | 715/764 |
| 5,970,218 A * | 10/1999 | Mullin et al. | ...... | 358/1.15 |
| 5,999,707 A * | 12/1999 | Taniguchi et al. | ...... | 358/1.15 |
| 6,160,629 A * | 12/2000 | Tang et al. | ...... | 358/1.1 |
| 6,166,826 A | 12/2000 | Yokoyama | ...... | 358/1.16 |
| 6,268,927 B1 | 7/2001 | Lo et al. | ...... | 358/1.15 |
| 6,441,924 B1 | 8/2002 | Matsui | ...... | 358/403 |
| 6,574,002 B1 | 6/2003 | Paczewitz | ...... | 358/1.13 |
| 6,678,068 B1 * | 1/2004 | Richter et al. | ...... | 358/1.15 |

FOREIGN PATENT DOCUMENTS

JP   9-212320    8/1997
JP   10-269036   10/1998

OTHER PUBLICATIONS

Paul McFedries, "Windows 98 Unleashed", Published: May 12, 1998, Publisher: Sam's, pp. A-C.*

* cited by examiner

*Primary Examiner* — Stephen Hong
*Assistant Examiner* — Wilson Tsui
(74) *Attorney, Agent, or Firm* — Fitzpatrick, Cella, Harper & Scinto

(57) ABSTRACT

In an information processing apparatus for forming print data which can be interpreted by a printing apparatus in accordance with document data formed by an application in order to enable the user to easily set the switching between a printer and a mail box as destinations, a user interface which can set either a mail box mode to accumulate the print data into the printing apparatus without printing it or a printer output mode to sequentially print the print data received by the printing apparatus is provided.

21 Claims, 9 Drawing Sheets

FIG. 8  ☐ USE MAIL BOX (X)

FIG. 9  ☑ USE MAIL BOX (X)

FIG. 13

| DESTINATION CHANGED |
|---|
| SWITCHED TO PRINTER OUTPUT MODE.<br>[ OK ] |

FIG. 14

| DESTINATION CHANGED |
|---|
| SWITCHED TO MAIL BOX MODE. CLICK "MAIL-BOX-SETTING" ICON TO OPEN DIALOG BOX AND SELECT MAIL BOX. |

IMAGE PROCESSING APPARATUS, INFORMATION PROCESSING METHOD, AND COMPUTER-READABLE MEMORY MEDIUM STORING PROGRAM THEREIN

This application is a continuation of application Ser. No. 09/491,865, filed Jan. 27, 2000, pending.

BACKGROUND OF THE INVENTION

1. Field of the Invention

The invention relates to information processing apparatus and method having a printer driver for controlling a printing apparatus having a print-function to print, for example, outputted print data onto a paper and eject and a mail-box-function which can store the print data to a hard disk. The invention also relates to a computer-readable memory medium which stores a printer driver program therein.

2. Related Background Art

Hitherto, a printer driver has a print-function for actually ejecting a paper and printing when a print job is outputted. On a printing apparatus side, print data received from an information processing apparatus as a host computer having the printer driver is analyzed, an output image is formed, and a printing process is performed.

Among printing apparatuses each having a memory of a large capacity, there is also a printing apparatus such that received print data is successively and temporarily spooled in the memory of the large capacity, a printing order is controlled on the basis of priorities and attributes of the print data, and a printing process is sequentially performed from a printer engine.

Further, in the recent printing apparatus, there is considered a mail-box-function such that print data is accumulated in a non-volatile storing unit such as a hard disk or the like of the printing apparatus main body and the printing is instructed from an operation panel of the printing apparatus main body, thereby performing the printing process for the first time.

The printer driver to form the print data, however, does not have the function to form the print data including the instruction such as to accumulate the print data into the printing apparatus main body as mentioned above, so that a mode to accumulate the print data into the memory has to be set by the operation panel of the printing apparatus main body.

SUMMARY OF THE INVENTION

It is, therefore, the first object of the invention that in case of using a mail-box-function for a printing apparatus having the mail-box-function, a function to designate a mail box of the printing apparatus as a destination of print data is installed for an information processing apparatus having a printer driver.

The mail-box-function considered in recent years corresponds to one area that is common to the printing apparatus and a plurality of users accumulate print data into the same mail box (memory). Therefore, when the printing is instructed from the operation panel of the printing apparatus main body, which user's data exists in the mail box is known by the operator and there is a fear such that the print data is erroneously print processed.

It is, therefore, the second object of the invention that a plurality of mail box areas are provided for a printing apparatus and a function which can select any of a plurality of mail boxes of the printing apparatus to be designated as a destination is installed in an information processing apparatus having a printer driver.

When the user selects the print data by operating an operation panel of the printing apparatus main body, a list of data stored in the mail box is displayed. However, the contents to be displayed are a reading (receiving) time, a host name, and a file name based on an application which formed document data. That is, in the case where a Word document of a host name of "hayashi" has been accumulated in the mail box at 14:30 on Jan. 14, 1999, [19990114_1430: hayashi: Word document] is displayed on the operation panel. However, in the case where a plurality of files are accumulated in the mail box from the same person, it is difficult to recognize them as files formed by the same application and there is a fear such that they are erroneously print processed.

It is, therefore, the third object of the invention that a function which can designate a document name that is displayed on the operation panel of the printing apparatus main body is installed in an information processing apparatus having a printer driver.

To accomplish the above objects, therefore, according to the invention, there is provided an information processing apparatus for forming print data which can be interpreted by a printing apparatus in accordance with the document data formed by an application, comprising: setting means for setting either a mail box mode to accumulate the print data into the printing apparatus without printing it or a printer output mode to sequentially print the print data received by the printing apparatus; and forming means for forming the print data by adding information indicative of a destination in the printing apparatus in accordance with the output mode set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing a picture plane to discriminate whether a mail box can be used or not;

FIG. 9 is a diagram showing a picture plane to discriminate whether the mail box can be used or not;

FIG. 13 is a diagram showing a message picture plane which is displayed in the case where a data destination is switched to a print-function;

FIG. 14 is a diagram showing a message picture plane which is displayed in the case where a data destination is switched to a mail-box-function.

DETAILED DESCRIPTION OF THE PREFERRED EMBODIMENTS

A print system comprising a printer having a function which can hold print data to a hard disk and a host computer using the printer will now be described as an embodiment of the invention.

[Construction of Print System]

Figure 1:
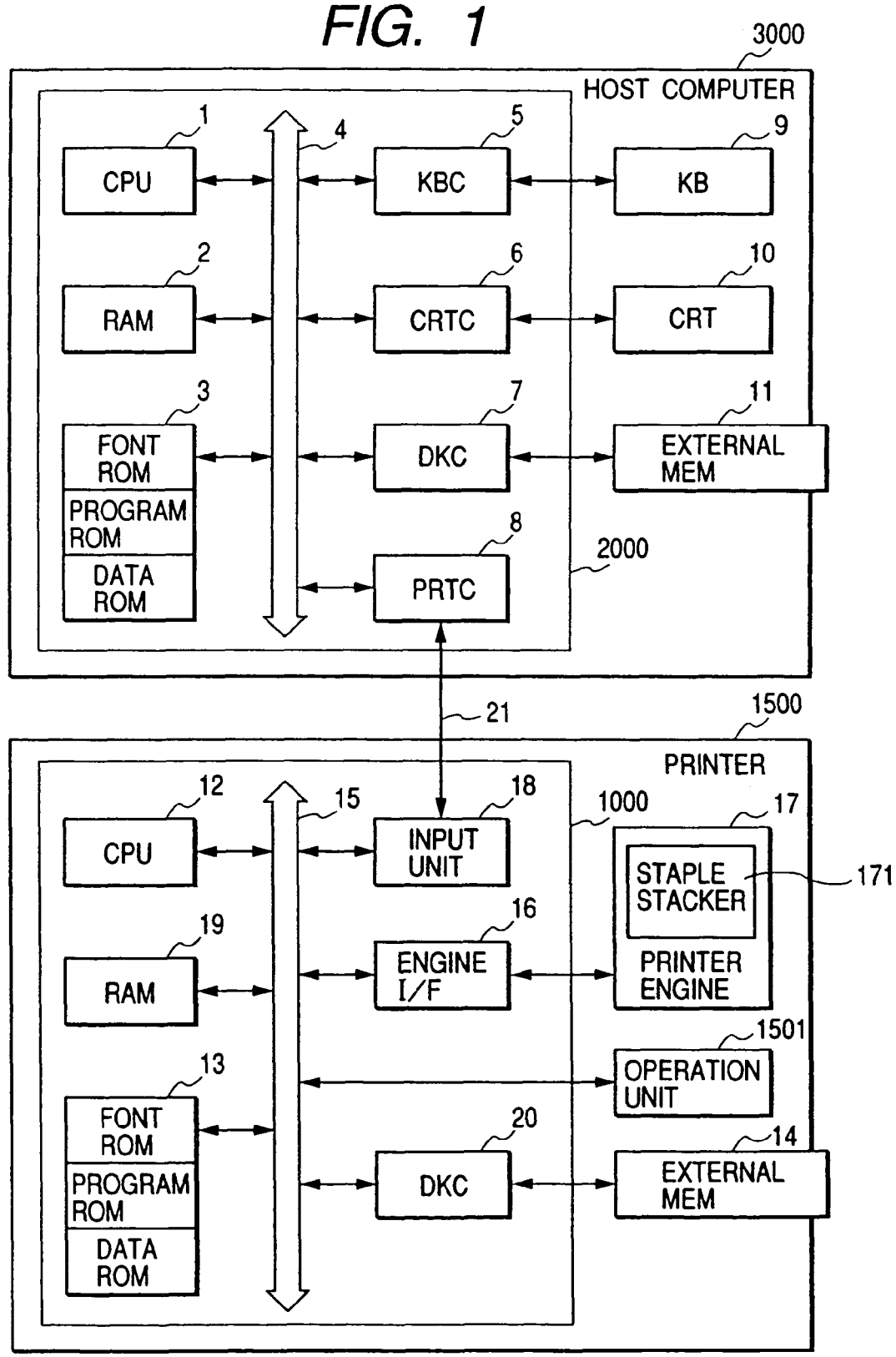
FIG. 1 is a block diagram of a print system comprising a host computer and a printer.

FIG. 1 is a block diagram of a print system comprising a host computer 3000 and a printer 1500.

In FIG. 1, reference numeral 3000 denotes the host computer according to the embodiment of an information processing apparatus of the invention. The host computer 3000 has a CPU 1 for executing a document process of a document in which a figure, an image, characters, a table (including a spreadsheet and the like), and the like mixedly exist on the basis of a document processing program or the like stored in a program ROM of an ROM 3. The CPU 1 integratedly controls each device that is connected to a system bus 4.

An RAM 2 functions as a main memory, a work area, or the like of the CPU 1. A keyboard controller (KBC) controls a key input from a keyboard 9 or a pointing device (not shown). A CRT controller (CRTC) 6 controls the display of a CRT display 10. A setting picture plane of the printer, which will be explained hereinlater, is also displayed on the CRT 10.

A disk controller (DKC) 7 controls an access to an external memory 11 such as hard disk (HD), floppy disk (FD), or the like to store a boot program, a printer driver, various applications, font data, a user file, an edit file, and the like. A printer controller (PRTC) 8 is connected to the printer 1500 through a predetermined bidirectional interface (bidirectional I/F) 21 and executes a communication control process with the printer 1500. The CPU 1 executes, for example, a developing (rasterizing) process of an outline font to a display information RAM set on the RAM 2, thereby enabling WYSIWYG (What you see is what you get: function for making the display contents coincident with the print contents) on the CRT 10. The CPU 1 also executes programs to realize procedures for flowcharts, which will be explained hereinlater, opens various registered windows on the basis of commands instructed by a mouse cursor or the like (not shown) on the CRT 10, and executes various data processes.

In the printer 1500, a CPU 12 integratedly controls accesses to various devices connected to a system bus 15 on the basis of control programs or the like stored in a program ROM of an ROM 13 and outputs an image signal as output information to a printer engine 17 connected through an engine I/F 16.

Besides the mechanism to print, a staple stacker 171 is included in the printer engine 17. Although the staple stacker 171 is provided separately from the printer, since it operates in association with the printer engine, it is regarded as a part of the printer engine 17.

The CPU 12 can communicate with the host computer via the bidirectional I/F 21 and can notify the host computer 3000 of the information or the like in the printer. An RAM 19 functions as a main memory, a work area, or the like of the CPU 12. An input unit 18 controls a communication of status information or the like such as printing state information or the like with the host computer 3000 through the bidirectional I/F 21 and can notify the host computer 3000 of the information or the like in the printer.

A memory controller (MC) 20 controls an access to an external memory 14 such as hard disk (HD), floppy disk (FD), or the like to store a boot program, various applications, font data, a user file, an edit file, and the like, and print data, which will be explained hereinlater. As for the external memory, a memory area is divided into a plurality of mail boxes, as will be explained hereinlater, and uses them.

An operation unit 1501 includes a display panel and a keyboard and allows information to be provided to the operator and allows a printing instruction or a selecting instruction to be inputted from the operator.

[Software Construction of Host Computer]

Figure 2:
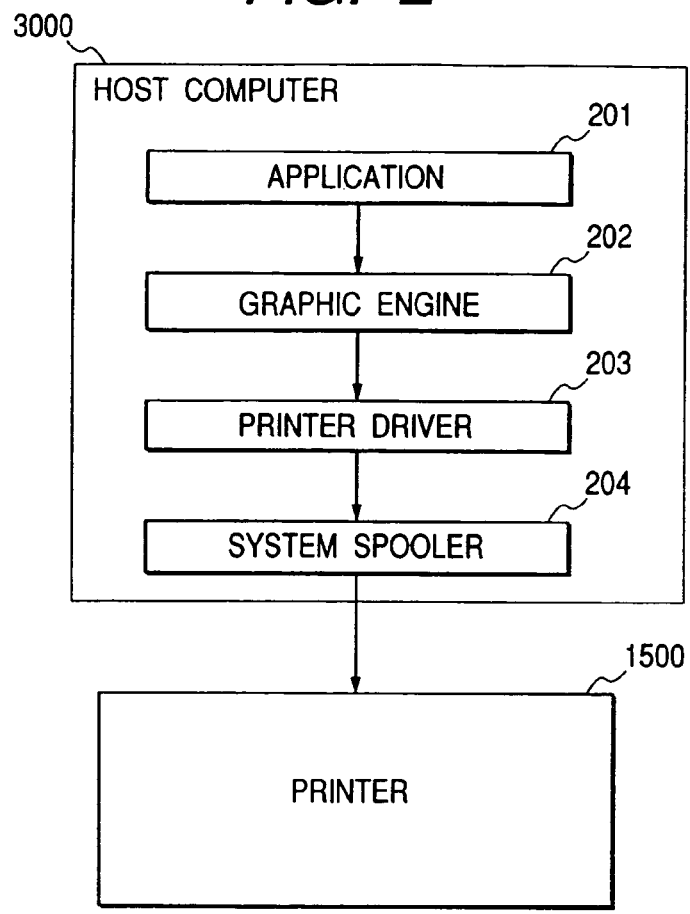
FIG. 2 shows software for printing in the host computer.

In such a system, a construction on software for allowing the host computer 3000 to print is as shown in FIG. 2.

An application 201, a graphic engine 202, a printer driver 203, and a system spooler 204 exist as files stored in the external memory 11 and are program modules which are loaded in the RAM 2 and executed by an OS or a module using the module when they are executed.

The application 201 and printer driver 203 can be added to an FD as an external memory 11 or a CD-ROM (not shown) or can be added to an HD as an external memory 11 via a network (not shown). Although the application 201 stored in the external memory 11 is loaded in the RAM 2 and executed, when the printing is performed from the application 201 to the printer 1500, the application 201 is similarly loaded in the RAM 2 and the outputting (drawing) is performed by using the graphic engine 202 which can be executed. Although data that is outputted from the application to the graphic engine differs depending on the kind of OS, for example, in case of using Windows (registered trademark of Microsoft Corporation), a GDI function is outputted as a drawing command to a GDI as a graphic engine.

The graphic engine 202 similarly loads the printer driver 203 prepared for every printing apparatus into the RAM 2 from the external memory 11, converts the GDI (Graphic Device Interface) function as an output of the application 201 to a DDI (Device Driver Interface) function, and outputs it to the printer driver 203.

On the basis of the DDI function received from the GDI, the printer driver 203 converts it to a printer control command comprising a PDL (Page Description Language) which can be interpreted by the printer 1500 and image data at a low level. The converted printer control command is outputted to the printer 1500 via the interface 21 through the system spooler 204 loaded in the RAM 2 by the OS. In this instance, the printer driver transmits information to control the mail box to the printer 1500 together with the print data in accordance with a procedure, which will be explained hereinlater.

Figure 3:
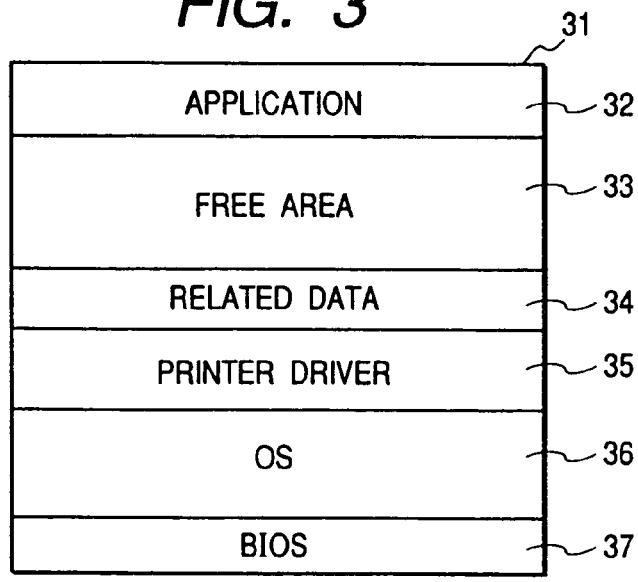
FIG. 3 is a diagram of a memory map upon printing in the host computer or printer setting.

FIG. 3 shows an example of a memory map in the RAM 2 at the time of printing in the host computer 3000 or at the time of setting of the printer. An application 32 performs the printing by using an OS 36 and a printing program (printer driver) 35. A BIOS 37 is a system called a basic input/output system. A program to drive a parallel interface, a serial interface, or the like which is connected to the printer 1500 is included in the BIOS 37. Related data 34 includes not only setting information for printing such as paper size, layout information, and the like but also setting information regarding a mail-box-function which is set and used by the printer driver and will be explained hereinlater.

A data destination setting procedure to use the mail-box-function will now be described with reference to flowcharts of FIGS. 4 and 5 and display examples of FIGS. 6 to 14.

The user sets a method of print processing in accordance with the printer to be used. As an example of the setting method, when the user calls a printer setting which is provided from the operating system (OS) or the like, the printer driver is called from the OS, a picture plane to set the setting information that is peculiar to the printer is displayed, and various items are set on this picture plane. According to the embodiment, it is assumed that the setting is performed by such a method.

Figure 6:
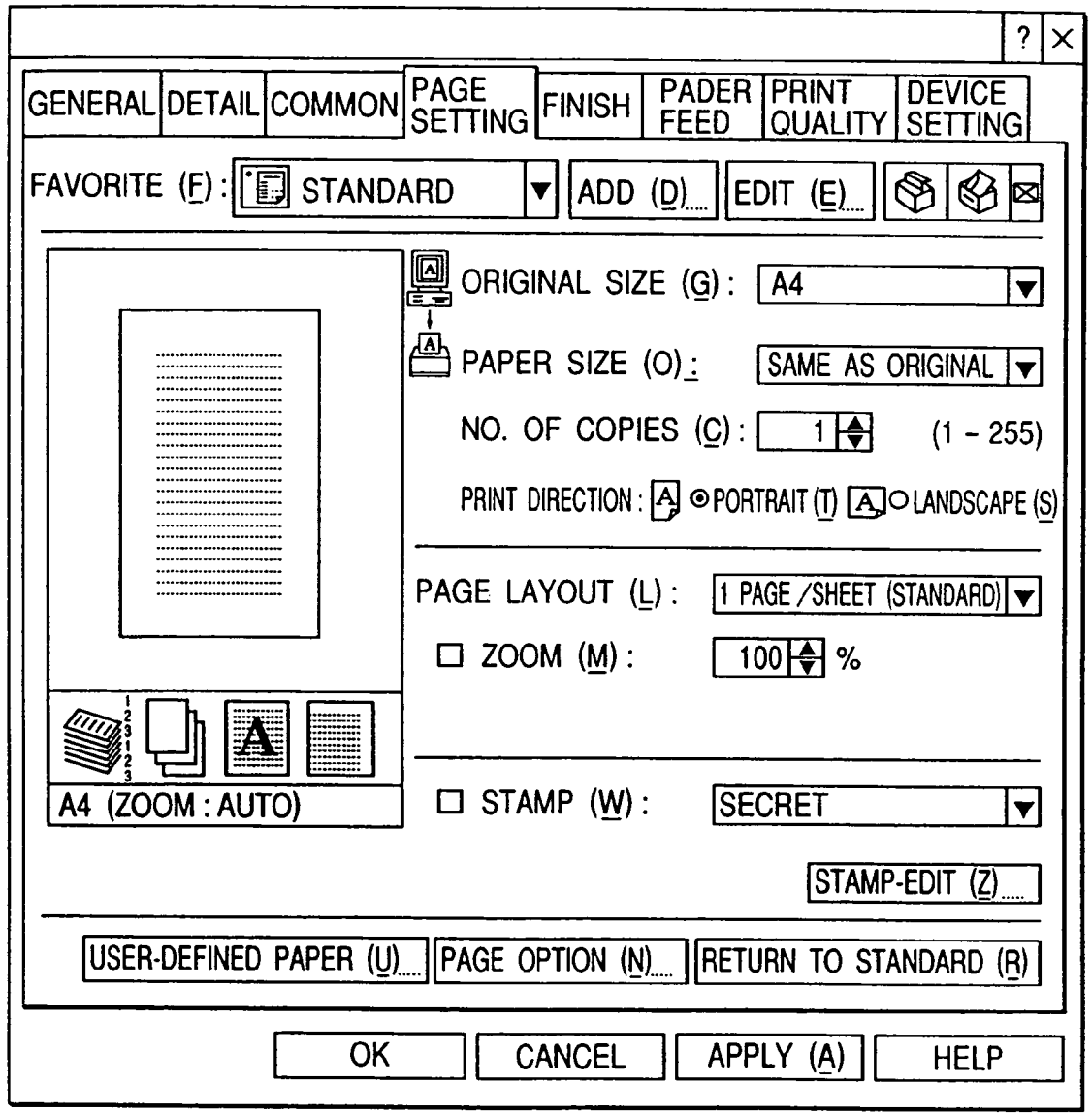
FIG. 6 is a diagram showing a data destination setting picture plane.

FIG. 6 shows an example of a picture plane of performing the printer setting when the printer setting is called by the user. In the example, there are setting items such as general, detail, page setting, finish, paper feed, and the like every setting and the user selects a desired picture plane in accordance with the information to be set.

FIG. 6 shows the example in which a page setting picture plane 601 is selected among the setting items. The user sets each item on this picture plane and sets a data destination by using the pointing device such as a mouse or the keyboard.

Figure 4:
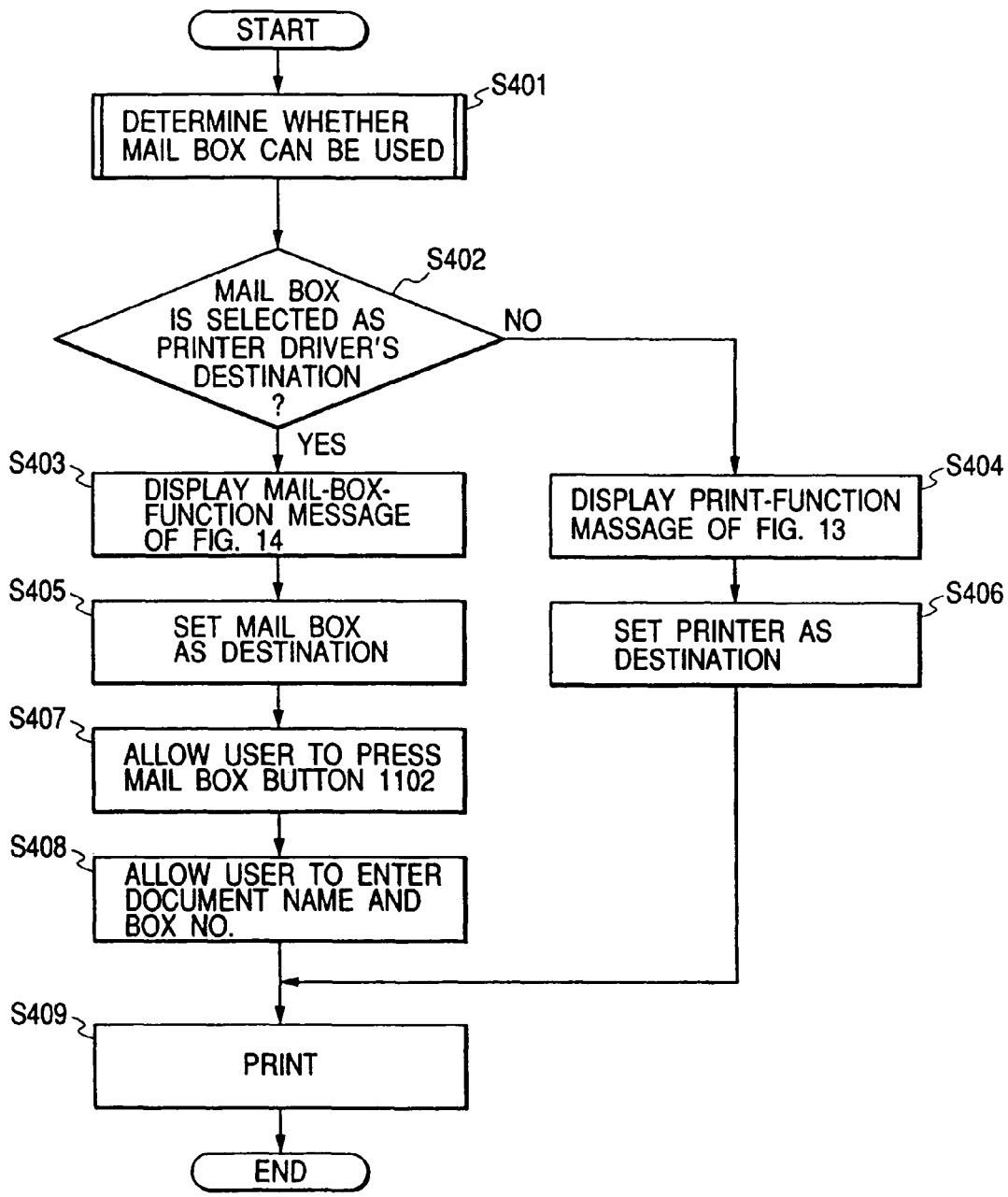
FIG. 4 is a flowchart for a procedure to set a data destination on a picture plane.
Figure 5:
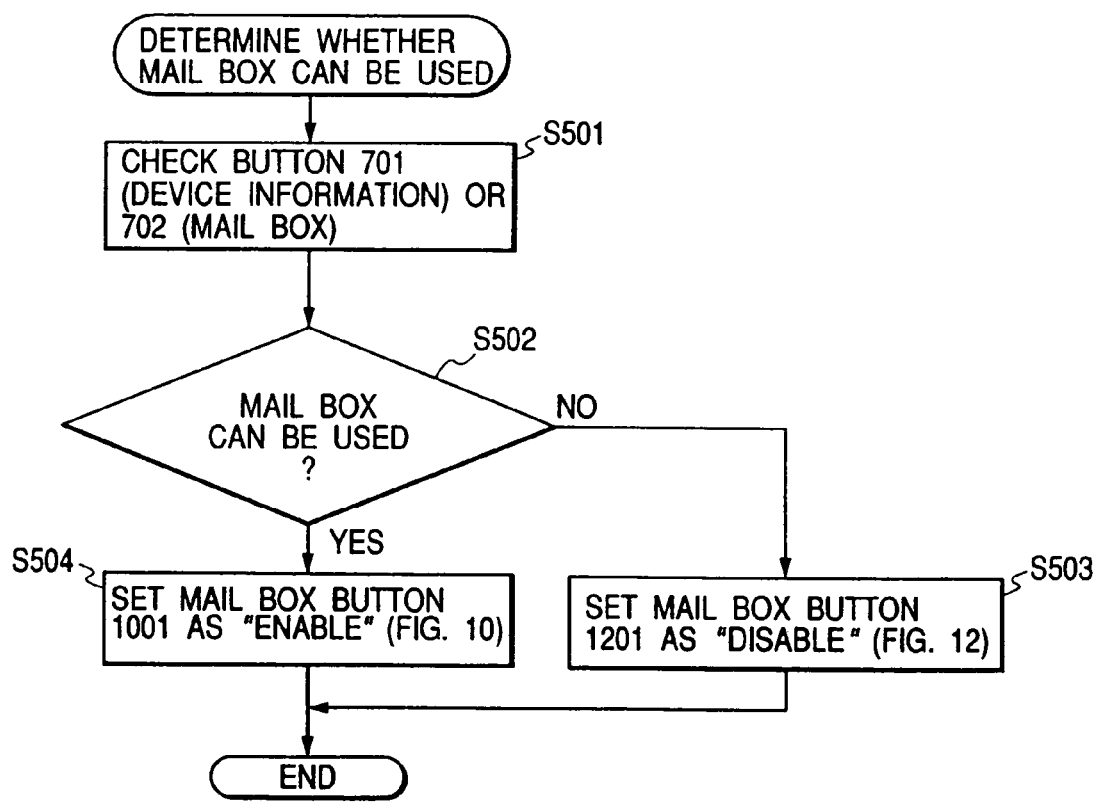
FIG. 5 is a flowchart for a procedure to set a data destination on the picture plane.

FIG. 4 or 5 is a flowchart for a procedure to set the data destination on the picture plane of FIG. 6.

First, in step S401, the CPU 1 executes a "Process for discriminating whether the mail box can be used or not". FIG. 5 is a flowchart for this process.

Figure 7:
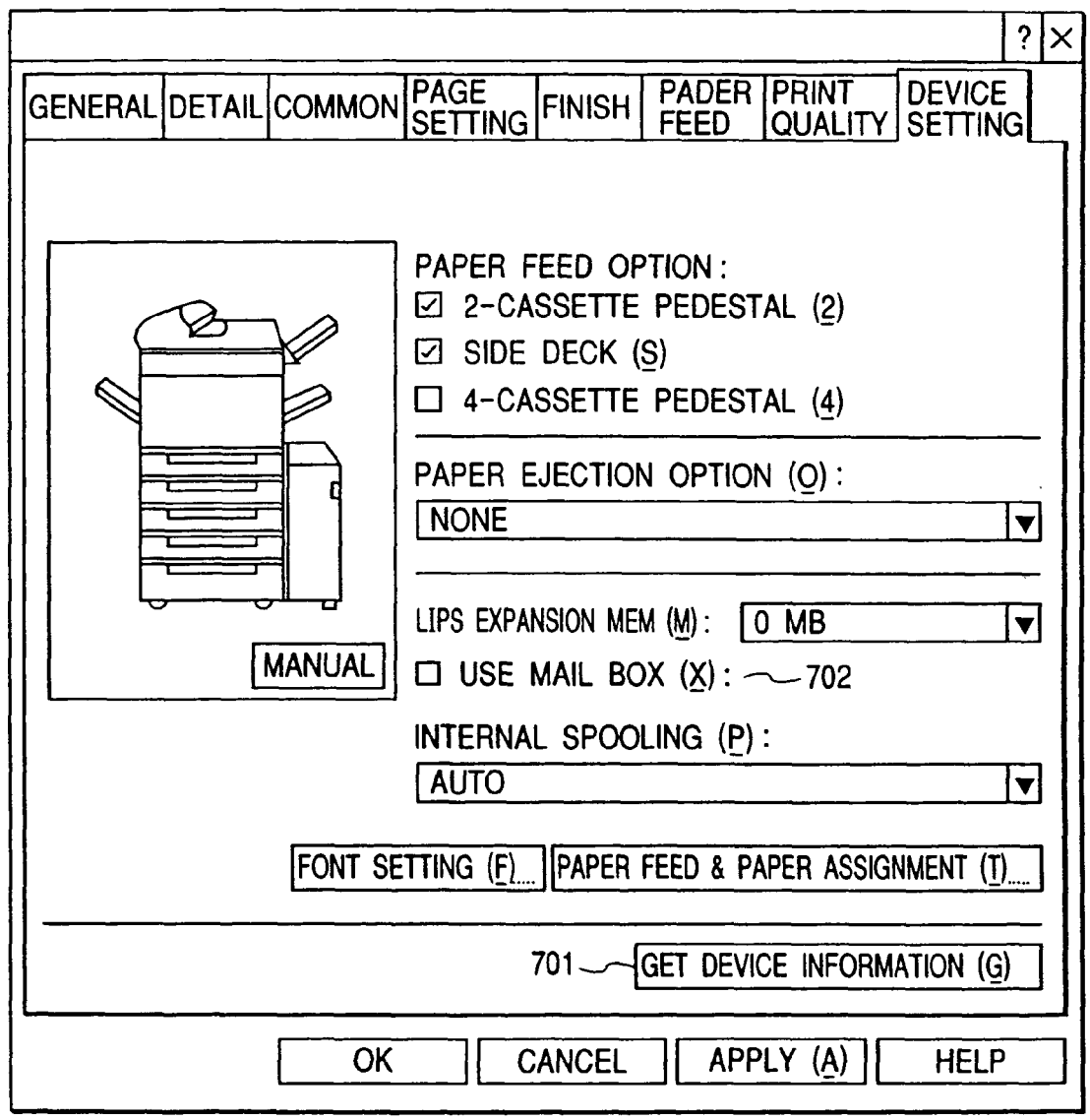
FIG. 7 is a diagram showing a device setting picture plane.

In step S501, whether the mail box can be used or not is determined by pressing a "Get device information" 701 or a check box 702 indicative of "Use mail box" in FIG. 7.

When the "Get device information" button 701 is pressed, a discrimination result about whether the mail box can be used or not can be automatically obtained from the printer. When the mail box can be used, the box number and the box name of the mail box of the printer are simultaneously obtained.

In the check box 702 of "Use mail box", the user sets whether the mail box can be used or not by the manual setting.

FIG. 8 shows a state where it is determined that the mail box cannot be used by obtaining the construction information or a state of the check box 702 in FIG. 7 in the case where the user sets a state where the mail box cannot be used by the manual setting.

FIG. 9 shows a state where it is determined that the mail box can be used by getting the construction information or a state of the check box 702 in FIG. 7 in the case where the user sets a state where the mail box can be used by the manual setting.

Figure 10:
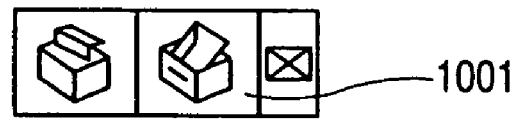
FIG. 10 is a diagram showing a data destination setting picture plane.

In next step S502, the CPU 1 discriminates whether the mail box can be used or not from the setting (state of 702 in FIG. 7) of the printer driver. When it is determined that the mail box can be used, in step S504, the icon of an output mode displayed at the upper right position in FIG. 6 is pressed, namely, a mail box button 1001 is set to "Enable" as shown in FIG. 10. The right side of the output mode icon indicates the mail box button 1001 and the left side shows a printer output button.

Figure 12:
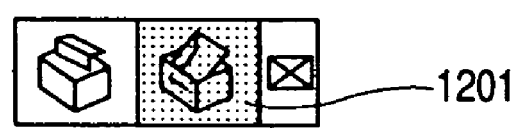
FIG. 12 is a diagram showing a data destination setting picture plane.

When it is decided in step S502 that the mail box cannot be used, in step S503, a mail box button 1201 is set to "Disable" as shown in FIG. 12. A display state of the mail box button 1201 is a gray display.

After completion of the process for discriminating whether the mail box can be used or not in step S401 in FIG. 4, the processing routine advances to a control of the destination.

In step S402, the CPU 1 discriminates whether the mail box button has been selected as a destination setting of the printer driver or not.

Figure 11:
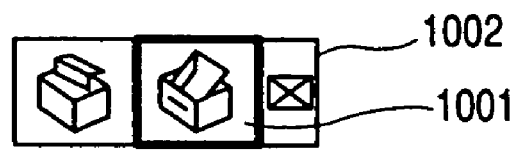
FIG. 11 is a diagram showing a data destination setting picture plane.

When the mail box button 1101 is selected as shown in FIG. 11, in step S403, a message of FIG. 14 is displayed to thereby promote the user to set the document name of the data to be transmitted and the box number and the user is allowed to set the document name and the box number on the user interface of the printer driver. The document name is a name for allowing the data stored in the mail box area of the printer main body to be displayed on the operation panel and allowing the user to identify it. For example, it is preferable for the user to set a name by which the contents can be easily known like "Materials for Meeting A" or the like.

Figure 15:
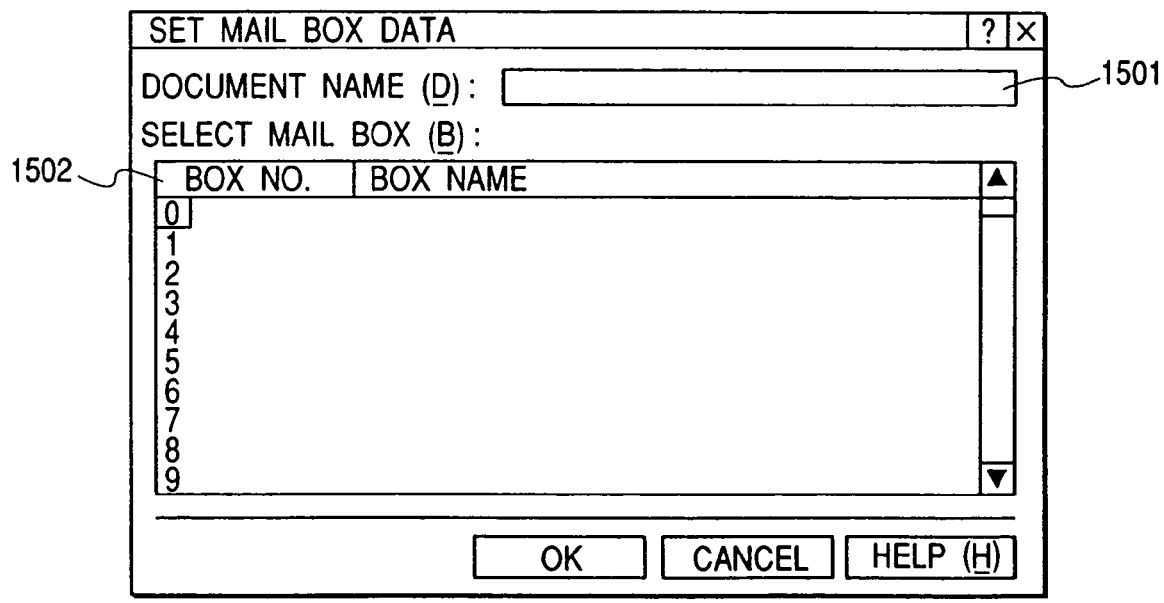
FIG. 15 is a diagram showing a mail box setting picture plane.

In step S405, the printer driver sets internal data indicative of the destination to the mail box. When the user wants to set the document name of the data to be transmitted to the mail box, in step S407, a mail box setting button 1102 in FIG. 11 is pressed, a "Set mail box data" dialog box in FIG. 15 is opened and set on the user interface. Although not shown in FIG. 15, the box number and the box name of the mail box are extracted from the device information obtained in step S501 in FIG. 5 and the box name is set and displayed in correspondence to the box number in FIG. 15. For example, the box number and the box name are displayed in the user interface of the printer driver on the host computer in FIG. 15 in a manner such that the box No. 0 is set to "Common Box", the box No. 1 is set to "First Party", the box No. 2 is set to "Second Party", the box No. 3 is set to "hayashi", the box No. 4 is set to "hosoi", the box No. 5 is set to "yamada", etc.

In step S408, the operator is allowed to designate a document name column 1501 of data to be transmitted and a mail box number column 1502 in FIG. 15, and the designated document name and mail box number are set to the printer driver.

The print data is stored on the basis of the designated box number so as to correspond to the number of mail box obtained by dividing the memory in the hard disk of the printer main body. The designated document name of the print data is registered in a management table in the printer. The box number and the data document name which are designated by the user in step S408 are displayed on the operation panel 1501 of the printer main body and can be confirmed.

When a printer output button is selected as shown in FIG. 10 as a discrimination result in step S402, a message of FIG. 13 is displayed in step S404 and the internal data of the destination is set to the printer in step S406.

After the mail box or printer is set as a destination, in step S409, print data comprising a PDL (Page Description Language) or image data at a low level is formed on the basis of a print quality or print style which has been set by the printer driver, and further, the internal data showing the destination. The printer driver adds information indicative of the destination (mail box number or direct output) in the printing apparatus, forms the print data, and transmits the formed print data to the printing apparatus.

The invention can be applied to a system comprising a plurality of apparatuses (for example, a host computer, interface equipment, a reader, a printer, and the like) or can be also applied to an apparatus comprising one equipment.

The objects of the invention can be also accomplished by a method whereby a memory medium in which program codes of software to realize the functions of the embodiment mentioned above have been stored is fed to a system or an apparatus and a computer (or a CPU or an MPU) of the system or apparatus reads out and executes the program codes stored in the memory medium.

In this case, the program codes themselves read out from the memory medium realize the novel functions of the invention and the memory medium in which the program codes have been stored constructs the invention.

As a memory medium to supply the program codes, for example, it is possible to use a floppy disk, a hard disk, an optical disk, a magnetooptic disk, a CD-ROM, a CD-R, a magnetic tape, a non-volatile memory card, an ROM, or the like.

The invention also incorporates not only a case where the computer executes the read-out program codes, so that the functions of the embodiment are realized, but also a case where an OS (Operating System) or the like which operates on the computer executes a part or all of the actual processes on the basis of instructions of the program codes, and the functions of the embodiment mentioned above are realized by those processes.

Further, the invention also incorporates a case where the program codes read out from the memory medium are written in a memory provided for a function expanding board inserted in the computer or a function expanding unit connected to the computer and, thereafter, a CPU or the like provided for the function expanding board or function expanding unit executes a part or all of the actual processes on the basis of the instructions of the program codes, and the functions of the embodiment mentioned above are realized by the processes.

The program codes themselves which are installed to the computer in order to realize the functions and processes of the invention by the computer also realize the invention. That is, the computer programs themselves to realize the functions and processes of the invention are included in claims of the invention.

As a method of supplying the computer program, the invention is not limited to the case where they are stored in an FD or a CD-ROM and read out by the computer and installed therein as mentioned above. The computer is connected to a homepage of the Internet by using a browser of the client computer and the computer program itself of the invention or a compressed file including an automatic installing function is downloaded from the homepage, so that the computer programs can be supplied. The invention can be also realized by a method whereby the program codes constructing the program of the invention are divided into a plurality of files and each file is downloaded from a different homepage. That is, a WWW server for downloading the program file to realize the functions and processes of the invention by the computer to a plurality of users is also incorporated in Claims of the invention.

The invention can be also realized by a method whereby the program of the invention is enciphered and stored in a memory medium such as an FD or the like and distributed to the user, key information to decrypt is downloaded from the homepage through the Internet to the user who can clear predetermined conditions, and the enciphered program is executed by using the key information and installed to the computer.

As described above, according to the invention, in case of using the mail-box-function for the printing apparatus having the mail-box-function, the function to designate the mail box of the printing apparatus as destination of the print data is installed in the information processing apparatus having the printer driver. Therefore, the control mode can be switched to a mode of setting the destination to the mail box or the mode to print the print data as it is without setting such a mode by the operation panel of the printing apparatus main body, and the user can easily handle the mail box.

In the information processing apparatus having the printer driver, since which one of a plurality of mail boxes of the printing apparatus is designated as destination can be selected, the mail box divided per application can be efficiently used and the security to the print data in the mail box is improved.

In the information processing apparatus having the printer driver, since the document name to be displayed on the operation panel of the printing apparatus main body can be designated by the printer driver, when the printing process of the print data stored in the mail box is performed by the operation panel of the printing apparatus main body, the operator can easily discriminate the print data of a desired document. The printing is not vainly performed and the mail-box-function can be easily handled by the operator.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
a processor;
an obtaining unit constructed to obtain, from a printing apparatus, information on a function of the printing apparatus and names of a plurality of memory areas of the printing apparatus;
an accepting unit constructed to accept a user selection of a first function that causes the printing apparatus to store first print data, or accept a user selection of a second function that causes the printing apparatus to print second print data, in accordance with an instruction input via a user interface based on the information obtained by said obtaining unit;
a display control unit constructed to display a user interface to display the names of the plurality of memory areas obtained by said obtaining unit in correspondence to respective memory area identifiers of the plurality of memory areas, in a case where said accepting unit accepts the user selection of the first function, the user interface being provided by a printing program that generates the first and second print data;
a designating unit constructed to designate, as a storing destination of the first print data, a memory area identifier from the memory area identifiers of the plurality of memory areas in accordance with an instruction input via the user interface displayed by said display control unit;
a generating unit constructed to generate the first print data based on the memory area identifier designated by said designating unit; and
a transmitting unit constructed to transmit the first print data generated by the generating unit to the printing apparatus, wherein the second print data, which is generated when said accepting unit accepts the user selection of the second function, is transmitted to the printing apparatus to which the first print data is transmitted.

2. The apparatus according to claim 1, wherein, when switching is made between the first function and the second function accepted by said accepting unit, said display control unit displays the user interface to display a message indicating that there is a change of the function.

3. The apparatus according to claim 1, wherein the user interface receives a name of the first print data to be transmitted to the printing apparatus when the first function is accepted by said accepting unit.

4. The information processing apparatus according to claim 1, further comprising:
a memory unit constructed to store a printer driver as the printing program, wherein said generating unit generates the first print data based on a document data issued by an application and the memory area identifier designated as the storing destination by said designating unit, the memory area identifier being a memory area number.

5. The information processing apparatus according to claim 1, wherein the memory area is a mail box area.

6. The information processing apparatus according to claim 1, wherein the information on the function of the printing apparatus indicates whether the printing apparatus is capable of using a mail box.

7. The information processing apparatus according to claim 1, wherein the first function further causes the printing apparatus to print the stored first print data in response to a print instruction entered via an operation panel provided in the printing apparatus.

8. An information processing method executed by a computer processor of an information processing apparatus, the method comprising:
   obtaining, from a printing apparatus, information on a function of the printing apparatus and names of a plurality of memory areas of the printing apparatus;
   accepting a user selection of a first function that causes the printing apparatus to store first print data, or accepting a user selection of a second function that causes the printing apparatus to print second print data, in accordance with an instruction input via a user interface based on the obtained information;
   displaying a user interface to display the obtained names of the plurality of memory areas in correspondence to respective memory area identifiers of the plurality of memory areas, when said accepting accepts the user selection of the first function, the user interface being provided by a printing program that generates the first and second print data;
   designating, as a storing destination of the first print data, a memory area identifier from the memory area identifiers of the plurality of memory areas in accordance with an instruction input via the displayed user interface;
   generating the first print data based on the designated memory area identifier; and
   transmitting the generated first print data to the print apparatus, wherein the second print data, which is generated when said accepting accepts the user selection of the second function, is transmitted to the printing apparatus to which the first print data is transmitted.

9. The method according to claim 8, wherein, when switching is made between the first function and the second function accepted in said accepting, a message indicating that there is a change of the function is displayed in said displaying.

10. The method according to claim 8, wherein the user interface receives a name of the first print data to be transmitted to the printing apparatus when the first function is accepted in said accepting.

11. The information processing method according to claim 8, further comprising storing in a memory a printer driver as the printing program,
   wherein said generating generates the first print data based on a document data issued by an application and the memory area identifier designated as the storing destination in said designating, the memory area identifier being a memory area number.

12. The method according to claim 8, wherein the memory area is a mail box area.

13. The method according to claim 8, wherein the information on the function of the printing apparatus indicates whether the printing apparatus is capable of using a mail box.

14. The method according to claim 8, wherein the first function further causes the printing apparatus to print the stored first print data in response to a print instruction entered via an operation panel provided in the printing apparatus.

15. A non-transitory computer readable storage medium storing code of a printer driver program executable by an information processing apparatus wherein said program comprises:
   code for obtaining, from a printing apparatus, information on a function of the printing apparatus and names of a plurality of memory areas of the printing apparatus;
   code for accepting a user selection of a first function that causes the printing apparatus to store first print data or accepting a user selection of a second function that causes the printing apparatus to print second print data, in accordance with an instruction input via a user interface based on the information obtained by the obtaining code;
   code for controlling a user interface to display the names of the plurality of memory areas obtained by said obtaining code in correspondence to respective memory area identifiers of the plurality of memory areas, when said accepting code accepts the user selection of the first function, the user interface being provided by a printing program that generates the first and second print data;
   code for designating, as a storing destination of the print data, a memory area identifier from the memory area identifiers of the plurality of memory areas in accordance with an instruction input via the user interface displayed by said display control code;
   a code for generating the first print data based on the memory area identifier designated by said designating code;
   and code for transmitting the first print data generated by the generating code to the printing apparatus, wherein the second print data, which is generated when said accepting code accepts the user selection of the second function, is transmitted to the printing apparatus to which the first print data is transmitted.

16. The computer readable storage medium according to claim 15, wherein, when switching is made between the first function and the second function accepted by said accepting code, said display control code displays the user interface to display a message indicating that there is a change of the function.

17. The computer readable storage medium according to claim 15, wherein the user interface receives a name of the first print data to be transmitted to the printing apparatus when the first function is accepted by said accepting code.

18. The computer readable storage medium according to claim 15, further comprising code for storing in a memory a printer driver as the printing program,
   wherein said generating code generates the first print data based on a document data issued by an application and the memory area identifier designated as the storing destination by said designating code, the memory area identifier being a memory area number.

19. The computer readable storage medium according to claim 15, wherein the memory area is a mail box area.

20. The computer readable medium according to claim 15, wherein the information on the function of the printing apparatus indicates whether the printing apparatus is capable of using a mail box.

21. The computer readable storage medium according to claim 15, wherein the first function further causes the printing apparatus to print the stored first print data in response to a print instruction entered via an operation panel provided in the printing apparatus.

* * * * *